United States Patent
Steck

(10) Patent No.: US 10,180,968 B2
(45) Date of Patent: Jan. 15, 2019

(54) GAUSSIAN RANKING USING MATRIX FACTORIZATION

(71) Applicant: NETFLIX, INC., Los Gatos, CA (US)

(72) Inventor: Harald Steck, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 356 days.

(21) Appl. No.: 15/044,020

(22) Filed: Feb. 15, 2016

(65) Prior Publication Data
US 2017/0024391 A1 Jan. 26, 2017

Related U.S. Application Data

(60) Provisional application No. 62/196,261, filed on Jul. 23, 2015.

(51) Int. Cl.
*G06F 17/30* (2006.01)
*G06N 99/00* (2010.01)

(52) U.S. Cl.
CPC .... *G06F 17/3053* (2013.01); *G06F 17/30702* (2013.01); *G06F 17/30867* (2013.01); *G06N 99/005* (2013.01)

(58) Field of Classification Search
CPC .................................................. G06F 17/3053
USPC ......................................................... 707/748
See application file for complete search history.

(56) References Cited

U.S. PATENT DOCUMENTS

| | | | |
|---|---|---|---|
| 9,129,227 B1* | 9/2015 | Yee | G06N 99/005 |
| 2008/0097941 A1* | 4/2008 | Agarwal | G06F 17/30864 706/12 |
| 2011/0087673 A1* | 4/2011 | Chen | G06F 17/30864 707/748 |
| 2017/0103343 A1* | 4/2017 | Yee | G06N 99/005 |

OTHER PUBLICATIONS

C. Bishop. "Neural networks for pattern recognition"; Oxford, 1995. (495 pages).
P. Cremonesi, Y. Koren, and R. Turrin. "Performance of recommender algorithms on top-N recommendation tasks". In ACM Conference on Recommender Systems, pp. 39-46 (8 pages), 2010.
D. J. Hand and R. J. Till. "A simple generalization of the area under the ROC curve for multiple class classification problems". Machine Learning, 45:171-186, 2001.
(Continued)

*Primary Examiner* — Baoquoc N To
(74) *Attorney, Agent, or Firm* — Artegis Law Group, LLP

(57) ABSTRACT

In one embodiment of the present invention, a training engine teaches a matrix factorization model to rank items for users based on implicit feedback data and a rank loss function. In operation, the training engine approximates a distribution of scores to corresponding ranks as an approximately Gaussian distribution. Based on this distribution, the training engine selects an activation function that smoothly maps between scores and ranks. To train the matrix factorization model, the training engine directly optimizes the rank loss function based on the activation function and implicit feedback data. By contrast, conventional training engines that optimize approximations of the rank loss function are typically less efficient and produce less accurate ranking models.

20 Claims, 6 Drawing Sheets

(56) References Cited

OTHER PUBLICATIONS

T. Ho. "The random subspace method for constructing decision forests". IEEE Transactions on Pattern Analysis and Machine Learning, 20:832-844, 1998.

Y. Hu, Y. Koren, and C. Volinsky. "Collaborative filtering for implicit feedback datasets". In IEEE International Conference on Data Mining (ICDM), 2008. (10 Pages).

Y. Koren. "Factorization meets the neighborhood: a multifaceted collaborative filtering model". In ACM Conference on Knowledge Discovery and Data Mining (KDD), pp. 426-434 (8 pages), 2008.

MovieLens. Univ. of Minnesota, homepage: http://grouplens.org/datasets/movielens/. (7 Pages).

R. Pan, Y. Zhou, B. Cao, N. Liu, R. Lukose, M. Scholz, and Q. Yang. "One-class collaborative filtering". In IEEE International Conference on Data Mining (ICDM), 2008. (10 Pages).

A. Paterek. "Improving regularized singular value decomposition for collaborative filtering". In KDDCup, 2007. (pp. 39-42).

S. Rendle, C. Freudenthaler, Z. Gantner, and L. Schmidt-Thieme. "BPR: Bayesian personalized ranking from implicit feedback". In Conference on Uncertainty in Artificial Intelligence (UAI), pp. 452-461, 2009.

R. Salakhutdinov and A. Mnih. "Probabilistic matrix factorization". In Advances in Neural Information Processing Systems (NIPS), 2008. (pp. 1-8).

Y. Shi, A. Karatzoglou, L. Baltrunas, M. Larson, A. Hanjalic, and N. Oliver. "TFMAP: optimizing MAP for top-n context-aware recommendation". In ACM SIGIR conference, 2012. (10 Pages).

Y. Shi, A. Karatzoglou, L. Baltrunas, M. Larson, N. Oliver, and A. Hanjalic. "CLiMF: Learning to maximize reciprocal rank with collaborative less-is-more filtering". In ACM Conference on Recommender Systems (RecSys), 2012. (pp. 139-146).

Y. Shi, M. Larson, and A. Hanjalic. "List-wise learning to rank with matrix factorization for collaborative filtering". In ACM Conference on Recommender Systems (RecSys), 2010. (pp. 269-272).

N. Srivastava, G. Hinton, A. Krizhevsky, I. Sutskever, and R. Salakhutdinov. "Dropout: A simple way to prevent neural networks from overfitting". Journal of Machine Learning Research, 15:1929-1958, 2014.

H. Steck. "Hinge rank loss and the area under the ROC curve". In Proceedings of the European Conference on Machine Learning (ECML), 2007.

H. Steck. "Training and testing of recommender systems on data missing not at random". In ACM Conference on Knowledge Discovery and Data Mining, pp. 713-722, 2010.

M. Weimer, A. Karatzoglou, Q. Le, and A. Smola. "Co rank-maximum margin matrix factorization for collaborative ranking". In Advances in Neural Information Processing Systems (NIPS), 2008.

J. Weston, H. Yee, and R. Weiss. "WSABIE: Scaling up to large vocabulary image annotation". In Int. Joint Conference on Artificial Intelligence (IJCAI), 2011. (9 Pages).

J. Weston, H. Yee, and R. Weiss. "Learning to rank recommendations with the k-order statistic loss". In ACM Conference on Recommender Systems (RecSys), 2013. (4 Pages).

W. Zhang, T. Chen, J. Wang, and Y. Yu. "Optimizing top-n collaborative filtering via dynamic negative item sampling". In ACM SIGIR Conference, 2013. (4 pages).

\* cited by examiner

Training Objective
410

$$\sum_u \sum_{i \in I(u)} \left[ L(s_{u,i}) + \lambda \cdot (\|\vec{q}_u\|^2 + \|\vec{q}_i\|^2) \right] + \sum_{j \in J} \gamma \cdot ([s_{u,j}]_+)^2$$

Training Pseudocode
420

1: Input: learning rate $\eta$, parameters $\lambda, \gamma$, training data.
2: Output: latent vectors $\vec{p}_i, \vec{q}_i$ for all items $i$.
3: do:
4: $\forall i : \vec{p}_i \leftarrow$ random initialization
5: $\forall i : \vec{q}_i \leftarrow$ random initialization
6: repeat
7:    for user $u$ do
8:       $\Lambda \leftarrow 0$
9:       $\vec{c} \leftarrow 0$
10:      $\vec{v}_u \leftarrow \sum_{j \in I_u} \vec{q}_j / \sqrt{N_u^{(+)}}$
11:      for all items $i \in I(u)$ do
12:        if $i \in I(u)$ then
13:          $err \leftarrow -L'(\vec{p}_i^T \vec{v}_u)$
14:          $\lambda_i \leftarrow \lambda$
15:          $\Lambda \leftarrow \Lambda + \lambda$
16:        else
17:          $err \leftarrow -\gamma [\vec{p}_i^T \vec{v}_u]_+$
18:          $\lambda_i \leftarrow 0$
19:        $\vec{c} \leftarrow \vec{c} + err \cdot \vec{p}_i / \sqrt{N_u^{(+)}}$
20:        $\vec{p}_i \leftarrow \vec{p}_i + \eta \cdot (err \cdot \vec{v}_u - \lambda_i \cdot \vec{p}_i)$
21:      for $i \in I(u)$ do
22:        $\vec{q}_i \leftarrow \vec{q}_i + \eta \cdot (\vec{c} - \Lambda \cdot \vec{q}_i)$
23: until convergence

Latent User Vector
450

$$\vec{v}_u = \frac{1}{\sqrt{N_u^{(+)}}} \sum_{j \in I(u)} \vec{q}_j = Q\vec{z}_u$$

User Score Equation
460

$$\vec{s}_u = P\vec{v}_u$$

Chain Rule
470

$$\frac{\partial L}{\partial \theta} = \frac{\partial L}{\partial r} \frac{\partial r}{\partial s^{(u)}} \frac{\partial s^{(u)}}{\partial s} \frac{\partial s}{\partial \theta}$$

FIGURE 4

GAUSSIAN RANKING USING MATRIX FACTORIZATION

CROSS-REFERENCE TO RELATED APPLICATIONS

This application claims benefit of the U.S. Provisional Patent Application having Ser. No. 62/196,261 and filed on Jul. 23, 2015. The subject matter of this related application is hereby incorporated herein by reference.

BACKGROUND OF THE INVENTION

Field of the Invention

Embodiments of the present invention relate generally to content delivery and distribution and, more specifically, to Gaussian ranking using matrix factorization.

Description of the Related Art

Many applications attempt to organize and/or convey items in a meaningful manner to users by implementing a ranking engine that attempts to rank items according to one or more metrics for a given user in real-time. For example, a video distribution application may execute a ranking engine that ranks videos based on the viewing history of a user. In conjunction with the ranking, the video distribution system also may display information related to the highest ranked videos in an attempt to convince the user that he or she would enjoy those videos and entice the user to select one or more of the videos to view.

To compute rankings for a given user, a typical ranking engine includes a trained ranking model that estimates a continuous-value score for each item in a list based on one or more factors and then ranks the items based on the scores. Accordingly, the quality of the rankings and the time required to perform ranking operations are dependent on the trained ranking model. Oftentimes, machine learning techniques are used to train the ranking model by minimizing a "rank loss" function that measures a deviation of the predicted ranks computed via the ranking model from the "true" ranks based on training data. Prior to training a ranking model, a particular rank loss function is chosen. For example, minimizing a particular rank loss function could maximize a normalized Discounted Cumulative Gain (nDGC) metric that emphasizes the ranking quality of the items at the head of a ranked list of items. For each user, a ranking model that is trained based on such a "nDGC" rank loss function produces more accurate rankings for items at the head of a ranked list and less accurate rankings for items at the tail of the ranked list.

Conventional optimization techniques that are considered to be computationally efficient, such as stochastic gradient descent, typically rely on the specific properties of the metrics that the training algorithm is designed to optimize in achieving computational efficiencies. In particular, when minimizing a rank loss function to optimize a ranking metric, conventional optimization techniques require a smooth mapping between scores and ranks. However, the actual mapping from scores to ranks is usually not smooth, meaning that, for example small changes in scores can result in disproportionately large changes in ranks. Therefore, ranking engines typically cannot implement these types of computationally efficient optimization techniques to directly optimize rank loss functions.

In view of the foregoing, some ranking engines directly optimize the rank loss function via less efficient conventional optimization techniques. However, the inherent inefficiencies associated with those techniques can cause the time required to directly optimize the ranking model to be unacceptably long. Other ranking engines attempt to use smooth approximations to rank loss functions that optimize approximate ranking metrics, where the approximate ranking metrics are associated with smooth mappings between scores and ranks. Subsequently, such ranking engines optimize the smooth approximations via computationally efficient optimization techniques. However, developing smooth approximations is typically a time consuming, manually-based process. Further, smooth approximations decrease the accuracy of the rankings produced when the trained ranking model is implemented.

As the foregoing illustrates, what is needed in the art are more effective techniques for training ranking models via rank loss functions.

SUMMARY OF THE INVENTION

One embodiment of the present invention sets forth a computer-implemented method for training a matrix factorization model to rank items. The method includes determining an activation function that maps between scores associated with items and ranks associated with the items based on an approximate Gaussian distribution of the scores; computing a first score for input data associated with a first item included in the items based on a matrix factorization model; computing a first value of a rank loss function based on the first score and the activation function; and modifying one or more elements included in the matrix factorization model based on the first value of the rank loss function.

One advantage of the disclosed techniques is that a training engine may implement the disclosed techniques to efficiently and accurately train the matrix factorization model. In particular, because the activation function provides a smooth mapping between scores and ranks, the training engine may directly optimize the rank loss function via optimization techniques that are considered to be computationally efficient, such as stochastic gradient descent. By contrast, the time required to optimize the ranking model using conventional approaches to training that implement less efficient conventional optimization techniques may be unacceptable long. Further, unlike conventional approaches to training that optimize a smooth approximation to the rank loss function, the disclosed techniques do not require time consuming development of a smooth approximation that is customized to a particular rank loss function.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is an example of a training pseudocode that the training engine of FIG. 2 may be configured to implement, according to various embodiments of the present invention;

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
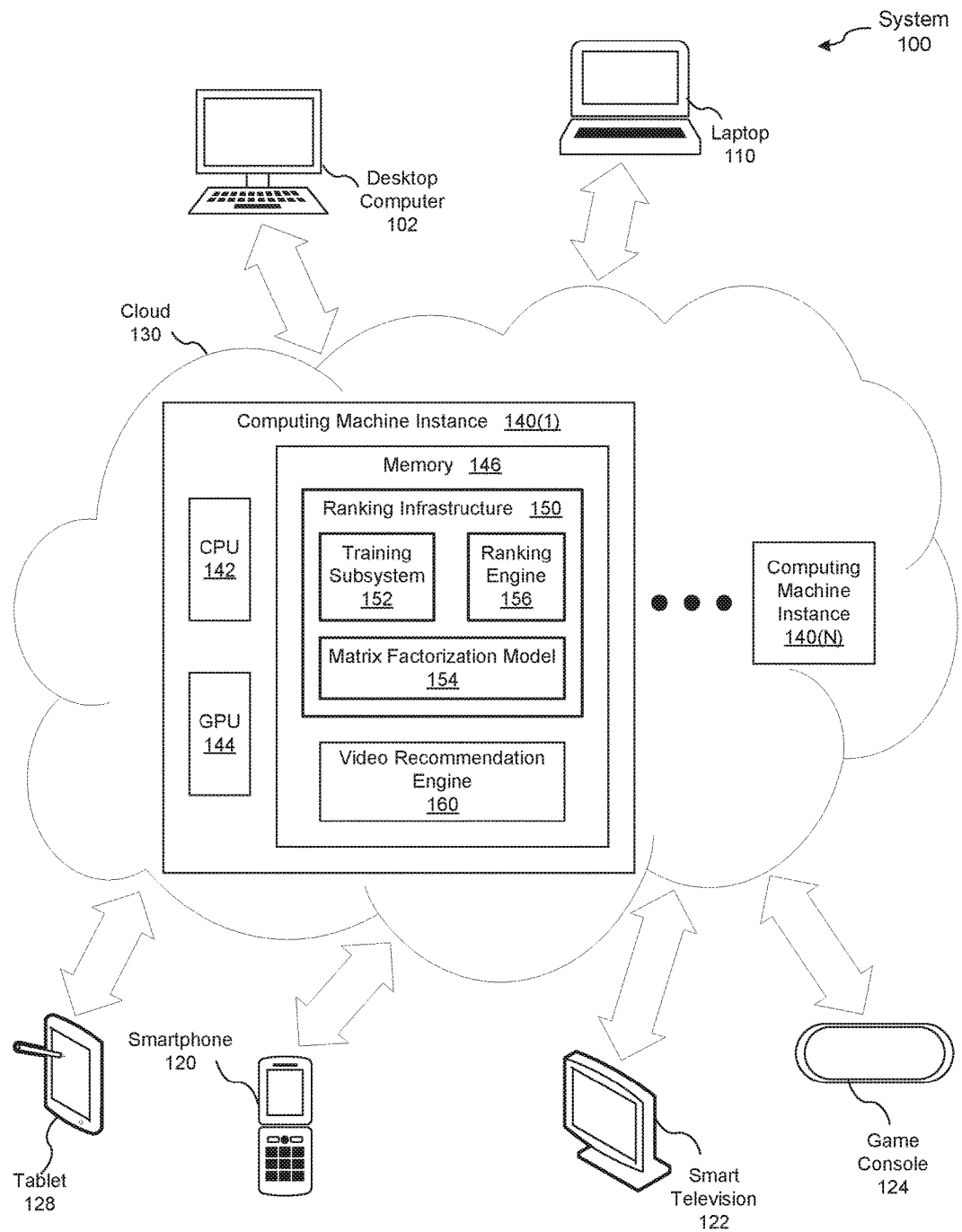
FIG. 1 is a conceptual illustration of a system configured to implement one or more aspects of the present invention.

FIG. 1 is a conceptual illustration of a system 100 configured to implement one or more aspects of the present invention. As shown, the system 100 includes a cloud 130 (e.g., encapsulated shared resources, software, data, etc.) connected to a variety of consumer devices capable of displaying videos. Such consumer devices include, without limitation, a desktop computer 102, a laptop 110, a smartphone 120, a smart television 122, a game console 124, a tablet 128, television-connected devices (not shown), handheld devices (not shown), and streaming entertainment devices (not shown). As used herein, a video refers to any item that includes audio-visual content. Videos may be manipulated (e.g., stored, encoded, compressed, transmitted, etc.) using any mechanisms known in the art. For example, one video may be stored as a compressed audio-video file, transmitted via the internet to a consumer device, and then decompressed for display purposes.

The cloud 130 includes any number of computing machine instances 140 configured with any number (including zero) of central processing units (CPUs) 142, graphics processing units (GPUs) 144, memory 146, etc. In operation, the CPU 142 is the master processor of the computing machine instance 140, controlling and coordinating operations of other components included in the computing machine instance 140. In particular, the CPU 142 issues commands that control the operation of the GPU 144. The GPU 144 incorporates circuitry optimized for graphics and video processing, including, for example, video output circuitry. In various embodiments, the GPU 144 may be integrated with one or more of other elements of the computing machine instance 140. The memory 146 stores content, such as software applications and videos, for use by the CPU 142 and the GPU 144 of the computing machine instance 140. In operation, the cloud 130 receives input user information from an input device (e.g., the laptop 110), one or more of the computer instances 140 operate on the user information, and the cloud 130 transmits processed information to the user.

In general, the computing machine instances 140 included in the cloud 130 are configured as servers in a video distribution subsystem, not shown, that process video streams and delivers video services associated with the video streams to the consumer devices over a network, such as the Internet. The video distribution subsystem includes any number of applications that operate on the video streams. In particular, the video distribution subsystem includes, without limitation, a video recommendation engine 160 and a ranking infrastructure 150.

Any number and combination of the computing machine instances 140 may implement the video recommendation engine 160 and the ranking infrastructure 150 in any technically feasible fashion. In alternate embodiments, the video recommendation engine 160 may be implemented independently of the ranking infrastructure 150. For example, in some embodiments the ranking infrastructure 150 may be included a separate computing machine instance 140 that communicates with the cloud 130 over the Internet. In other embodiments, any portion of the functionality of the video recommendation engine 160 and/or the ranking infrastructure 150 may be distributed across any number, including one, of the computing machine instances 140.

In alternate embodiments, the cloud 130 may be replaced with any type of cloud computing environment. In other embodiments, the system 100 may include any distributed computer system instead of the cloud 130. In yet other embodiments, the system 100 does not include the cloud 130 and, instead, the system 130 includes one or more computing machine instances 140 that implement any number of processing units (e.g., central processing units and/or graphical processing units in any combination).

The video recommendation engine 160 dynamically ranks videos based on previous user interactions for a given user. More precisely, the video recommendation engine 160 configures the ranking infrastructure 150 to generate user-specific ranked lists of videos. For a given user, the video recommendation engine 160 then displays the rankings for the items at the head of the ranked list. In conjunction with displaying the rankings, the video recommendation engine 160 may also display information related to the highest ranked videos in an attempt to convince the user that he or she would enjoy those videos and entice the user to select one or more of the videos to view.

As shown, the ranking infrastructure 150 includes, without limitation, a training subsystem 152, a matrix factorization model 154, and a ranking engine 156. To rank videos, the ranking infrastructure 150 implements a two phase machine learning approach. In a training phase, the training subsystem 152 trains the matrix factorization model 154 based on input data that reflects preferences expressed by multiple users for multiple videos. In an execution phase, the ranking engine 156 computes a ranked list of videos for a given user based on the trained matrix factorization model 154.

In general, the ranking infrastructure 150 implements algorithms that estimate a continuous-value score for each video based on one or more factors and then ranks the items based on the scores. Notably, during the training phase, the training subsystem 152 trains the matrix factorization model 154 based on minimizing a rank loss function that measures a deviation of the predicted ranks computed via the ranking model from the "true" ranks based on training data. In operation, minimizing the rank loss function optimizes one or more ranking metrics that are associated with the rank loss function. For example, in some embodiments, because consumer devices may be capable of displaying information associated with only a limited number of videos, the video recommendation engine 160 may be configured to display the twenty-five highest ranked videos. In such embodiments, the training subsystem 152 may minimize a rank loss function that is associated with a ranking metric that emphasizes the recommendation quality of the items at the head of the ranked list of videos.

However, one complication of optimizing many rank loss functions is that for the ranking metric associated with the rank loss function, the mapping between scores and ranks is not smooth. Notably, small change in scores may result in disproportionately large changes in ranks. Further, many conventional optimization techniques that are considered to be computationally efficient, rely on a smooth mapping between scores and ranks. For example, some of the operations implemented as part of stochastic gradient descent techniques involve computing the derivative of a rank loss function. If there is not a smooth mapping between scores and ranks, then the derivative of the rank loss function is undefined and the rank loss function is referred to herein as not "differentiable."

For this reason, some conventional training subsystems directly optimize the rank loss function via less efficient conventional optimization techniques and, consequently, may require unacceptable long amounts of time to train ranking models. To reduce the time required to train ranking models, other conventional training subsystems implement smooth approximations to rank loss functions and then optimize the smooth approximations via conventional optimization techniques that are considered to be computationally efficient. However, while training subsystems that implement computationally efficient optimization techniques may require less time to train ranking models than training subsystems that implement less efficient optimization techniques, developing smooth approximations is typically a time consuming, manually-based process. Further, optimizing smooth approximations instead of directly optimizing rank loss functions decreases the accuracy of the rankings produced when the trained ranking model is implemented.

For these reasons, the training subsystem 152 implements an "activation" function that provides a smooth mapping between scores and corresponding ranks. In operation, the training subsystem 152 computes the derivative of the rank loss function with respect to the values included in the matrix factorization model 154 based on the activation function. Notably, computing the derivative of the rank loss function based on the differentiable activation function enables the ranking infrastructural 150 to directly optimize the rank loss function via efficient optimization techniques, such as stochastic gradient descent. Consequently, the training subsystem 152 may efficiently optimize the matrix factorization model 154 and the ranking engine 156 may efficiently and accurately rank videos for users based on the matrix factorization model 154.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the techniques described herein may be applied to rank any type and number of items for any type and number of objects. Further, the techniques may be applied in conjunction with any type of machine learning algorithms that optimize any rank loss function based on any activation function that provides a smooth mapping between scores and ranks.

Ranking Infrastructure

Figure 2:
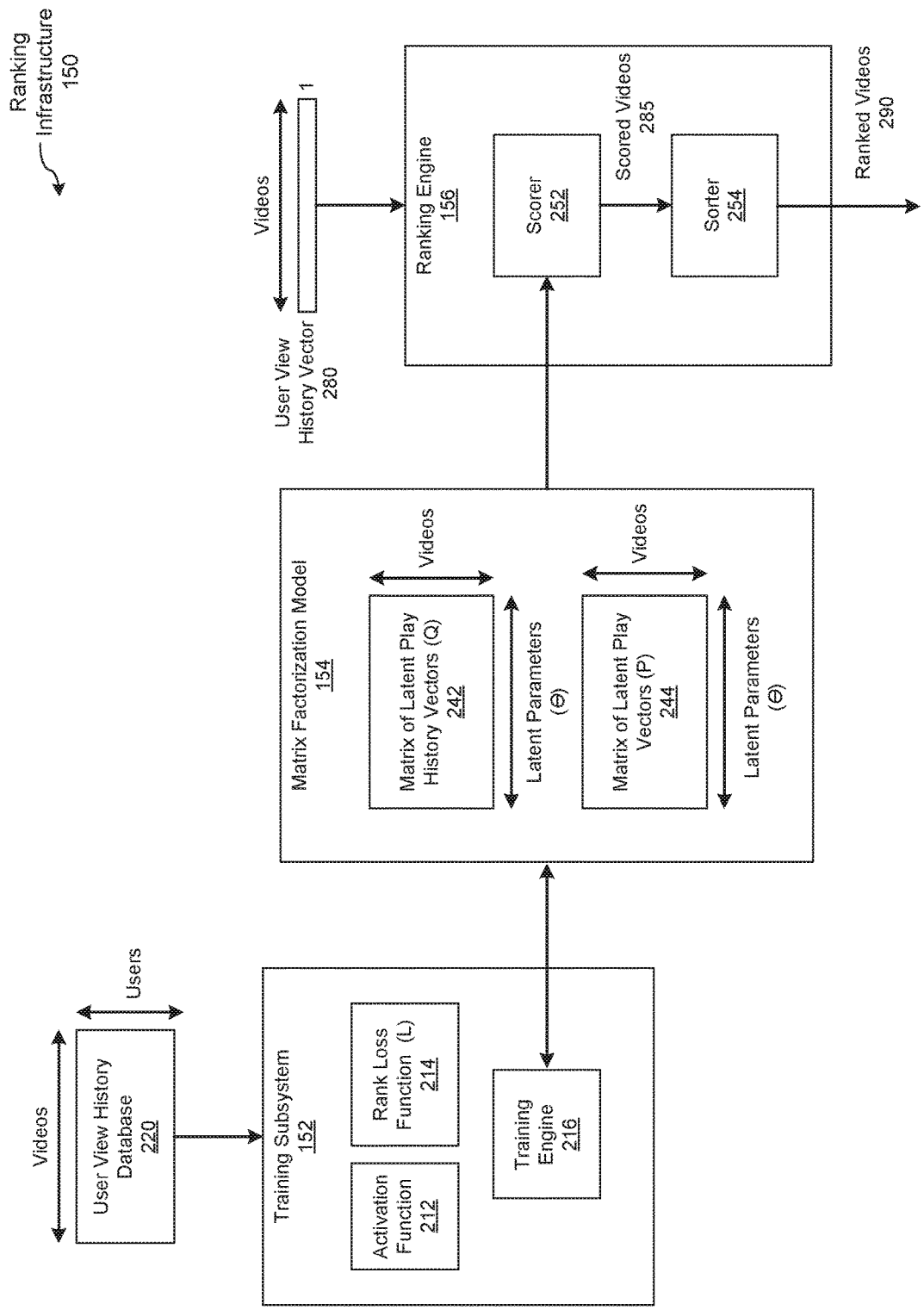
FIG. 2 is a more detailed illustration of the ranking infrastructure of FIG. 1, according to various embodiments of the present invention.

FIG. 2 is a more detailed illustration of the ranking infrastructure 150 of FIG. 1, according to various embodiments of the present invention. As shown, the ranking infrastructure 150 includes, without limitation, the training subsystem 152, the matrix factorization model 154, and the ranking engine 156. For explanatory purposes only, the ranking infrastructure 150 is configured to rank videos for users. In alternate embodiments, the ranking infrastructure 150 may be configured to rank any type of items for any type of objects.

In the training phase, the training subsystem 152 receives a user view history database 220 and trains the matrix factorization model 150. Subsequently, the ranking engine 156 receives a user view history vector 280 and generates ranked videos 290 for the user based on the matrix factorization model 154. The user view history database 220 includes binary implicit feedback data that reflects the historical video viewing history of users. The user view history vector 280 reflects the historical video viewing history of a single user. Accordingly, the user view history vector 280 may be a subset of the information included the user view history database 220. For example, the user view history vector 280 for a given user may correspond to a single row included in the user view history database 220.

Each element included in the user view history database 220 is referred to herein as either "positive" or "negative". If an element that is associated with a given user and a given video is positive, then the user has provided positive implicit feedback regarding the video. For example, if a given user has watched a given video, then the user has provided positive feedback regarding the video. Accordingly, the element included in the binary implicit feedback data that is associated with the user and the video is positive. For explanatory purposes only, all elements that are not positive are referred to herein as negative.

For example, for a particular user, the user view history database 220 could include "unobserved" negative elements that are associated with videos that the user has not yet viewed but will view in the future. The user view history database 220 could also include "true" negative elements that are associated with videos that the user will never view. Because a typical user has watched a relatively small percentage of the videos included in the user view history database 220, the user view history database 220 is referred to as "sparse." As a general matter, the number of positive items included in the user view history database 220 is orders of magnitude less than the number of negative items included in the user view history database 220.

As shown, the matrix factorization model 154 includes, without limitation, a matrix of latent play history vectors (Q) 242 and a matrix of latent play vectors (P) 244. Each of the matrix of latent play history vectors 242 and the matrix of latent play vectors 244 includes a separate row for each video included in the user view history database 220 and a separate column for each of multiple latent parameters. Accordingly, the size of each of the matrix of latent play history vectors 242 and the matrix of latent play vectors 244 equals the number of videos multiplied by the number of latent parameters. In general, as part of generating a score for a given user and a given video, the ranking engine 156 maps the user view history vector 280 via the matrix of latent play history vectors (Q) 242 to the latent user vector. The ranking engine 156 then multiplies the matrix of latent play vectors (Q) 244 and the latent user vector to obtain a score for each of the videos.

As persons skilled in the art will recognize, a score for a given user and a given video is the dot product of the latent user vector associated with the user and a "latent item vector" associated with the video. The latent item vector is a row in the matrix of latent play vectors (P) 244. In this fashion, the dot product is a sum over the latent dimensions.

More specifically, in each latent dimension, the corresponding elements of the latent user vector and the latent item vectors are multiplied.

As part of optimizing the matrix factorization model 154, the training subsystem 152 infers the latent parameters from the user view history database 220. Typically, such latent parameters reflect characteristics of the videos, such as genre. To ensure that the latent parameters are relatively independent, the training subsystem 152 initializes the elements included in the matrix of latent play history vectors 242 and the matrix of latent play vectors 244 to random values before training the matrix factorization model 154.

The training subsystem 152 includes, without limitation, an activation function 212, a rank loss function (L) 214, and a training engine 216. The activation function 212 provides a smooth mapping from scores to corresponding ranks that is based on properties of the user view history database 220 and the matrix factorization model 154. More specifically, because the user view history database 220 is both binary and sparse and the vast majority of the items included in the user view history database 220 are negative, the contribution of the positive items to the distribution of scores is negligible. Further, as described previously herein, since each score is a sum over essentially independent latent parameters, the central limit theorem of statistics implies that the distribution of the scores associated with the various videos follows an approximately Gaussian distribution for the reasonably large numbers of latent dimensions that are typically used. Advantageously, for a Gaussian distribution of scores, a cumulative distribution function (CDF) derived from the Gaussian distribution provides a smooth mapping from scores to corresponding ranks.

Accordingly, the training subsystem 152 is configured to implement the activation function 212 based on an approximation to a CDF derived from a Gaussian distribution of scores. The training subsystem 512 may implement any activation function 212 that is consistent with a Gaussian distribution of scores. In alternate embodiments, the training subsystem 512 may operate on any type of input data, train any type of ranking model, and implement any smooth mapping between scores and ranks that is based on the properties of the input data and/or the ranking model. For example, the training subsystem 512 may train the matrix factorization model 154 to rank any type of items instead of videos.

In operation, the training subsystem 152 optimizes the matrix factorization model 154 based on the rank loss function (L) 214. The rank loss function 214 may be any function that measures errors between the predicted ranks computed via the matrix factorization model 154 and true ranks based on the user view history database 220. Notably, the training subsystem 152 may be configured to minimize any one of a number of rank loss functions. For example, in some embodiments, the training subsystem 152 may be configured to optimize the matrix factorization model 154 based on the rank loss function 214 that is associated with a normalized Discounted Cumulative Gain (nDCF) to emphasize the quality of the ranks at the head of the ranked videos 290. In other embodiments, the training subsystem 152 may be configured to measure the quality of the matrix factorization model 154 based on the area under the receiver operating characteristic (ROC) curve to equally weight the quality of the ranks across all the ranked videos 290.

As a general matter, the training subsystem 152 may be configured to implement any rank loss function 214 that is differentiable with respect to the rank of the positive items when the rank is considered a continuous variable. As persons skilled in the art will recognize, many rank loss functions are differentiable with respect to the rank of the positive items when the rank is considered a continuous variable. For example, and without limitation, such rank loss functions include rank loss functions that measure a normalized Discounted Cumulative Gain (nDCG) metric, rank loss functions that measure the area under the receiver operating characteristic (ROC) curve, and so forth. Further, the training subsystem 152 may optimize a general training objective that is based on the rank loss function 214 using any optimization techniques. For example, in some embodiments, the training subsystem 152 may apply machine learning techniques to optimize a training objective that includes a rank loss function 214 and "regularization" terms designed to minimize prediction errors.

In various embodiments, the training subsystem 152 may implement any type and number of techniques that optimize the rank loss function 214 based on the activation function 212. For example, in some embodiments, the training subsystem 152 may be configured to perform pointwise ranking operations that individually optimize the rank for each combination of user and video based on computing a derivative of the activation function 214 with respect to the score. In other embodiments, the training subsystem 152 may be configured to perform listwise ranking operations that optimize the ranks for a given user across all videos in a holistic fashion. In some embodiments, as part of such a listwise optimization approach, the training subsystem 152 may explicitly rank the videos for a given user and then map the rankings to corresponding scores based on a "reverse" mapping of ranks to corresponding scores. Such a reverse mapping is provided by the activation function 214.

After the training subsystem 152 has finished training the matrix factorization model 154, the ranking engine 156 generates the ranked videos 290 for a given user based on the matrix factorization model 154. As shown, the ranking engine 156 includes, without limitation, a scorer 252 and a sorter 254. Upon receiving the user view history vector 280 for a given user, the scorer 252 performs multiplication operations between the user view history vector 280 and the matrix of latent play history vectors 242. The scorer then normalizes the resulting vector to generate a "latent user vector" that maps the user to the latent parameters. Subsequently, the scorer 252 multiples the latent user vector and the matrix of latent play vectors 244 to compute scored videos 285 for the user. Finally, the sorter 254 performs sorting operations on the scored videos 285 to generate the ranked videos 290. The sorter 254 may implement any type of sorting operations in any technically feasible fashion.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the matrix factorization model 154 described herein is known as an "asymmetric" matrix factorization model. Accordingly, the latent user vector is defined as the (normalized) sum of the latent vectors associated with the videos that the user has viewed. In alternate embodiments, the (asymmetric) matrix factorization model 154 may be replaced with a "standard" matrix factorization model. In such embodiments, the latent user vector is defined as a vector that optimizes a training objective function. In yet other alternate embodiments, the matrix factorization mode 154 may be replaced with any technically feasible type of matrix factorization model.

Training and Applying the Matrix Factorization Model

Figure 3:
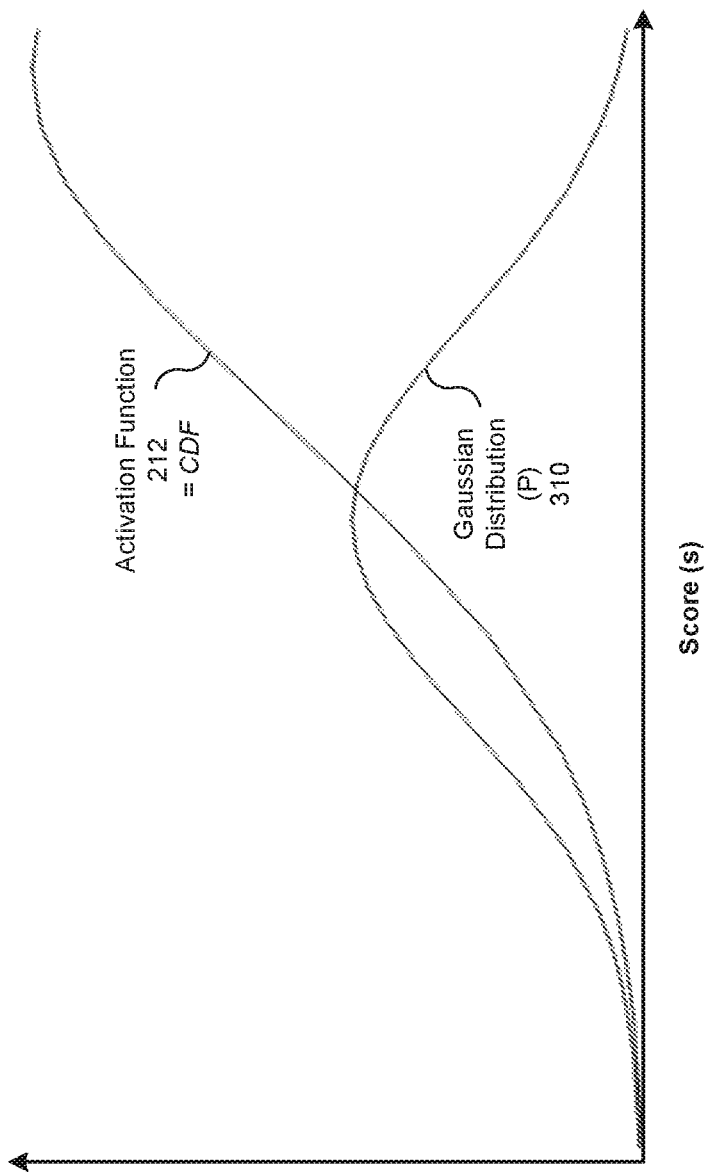
FIG. 3 is a graphical illustration of the activation function of FIG. 2, according to various embodiments of the present invention.

FIG. 3 is a graphical illustration of the activation function 212 of FIG. 2, according to various embodiments of the present invention. For each user, the training engine 216 approximates the distribution of the predicted scores as a Gaussian distribution 310 with zero mean and a standard deviation. The training engine 216 may assign the standard deviation in any technically feasible fashion. For example, in some embodiments, the training engine 216 may set the standard deviation to a constant irrespective of the user. In other embodiments, the training engine 216 may compute a different standard deviation for each user.

As a general matter, a rank of a video depends on the normalized score s of the video. More specifically, the rank=max {1, N·(1−CDF(score))}, where N is the total number of videos included in the user view history database 210 and CDF is the cumulative distribution function (CDF) of the Gaussian distribution (P) 310 of the scores:

$$CDF(s) = \int_{-\infty}^{s} P(x)dx \quad (1)$$

Because the CDF provides a smooth link between scores and the corresponding ranks, the training engine 216 implements the activation function 212 based on a CDF derived from the Gaussian distribution 310. More precisely, to reduce the time required to train the matrix factorization model 154, the training engine 216 typically sets the activation function 212 to an approximation of the CDF derived from the Gaussian distribution 310. The training engine 216 may compute and assign the activation function 212 in any technically feasible fashion. For example, in some embodiments, the training engine 216 may set the activation function 212 to a logistic or sigmoid function with appropriate scaling. In other embodiments, the training engine 216 may set the activation function 212 to a piecewise quadratic function with appropriate scaling.

FIG. 4 is an example of a training pseudocode 420 that the training engine 216 of FIG. 2 may be configured to implement, according to various embodiments of the present invention. The training pseudocode 420 may be implemented in any technically feasible fashion. For example, in some embodiments, the training pseudocode 420 is written in Java and stored as part of the training engine 216 in the memory 146. Executing the training pseudocode 420 configures the CPU 142 to train the matrix factorization model 154 based on the rank loss function 214 and the user view history database 220. For explanatory purposes, operations that the training engine 216 performs based on the training pseudocode 420 are referred to herein as operations executed by the training engine 216.

For explanatory purposes only, the training pseudocode 420 reflects a pointwise approach. In alternate embodiments, the training pseudocode 420 may reflect any technically feasible optimization approach. For example, in some embodiments, the training pseudocode 420 may be modified to reflect a listwise approach instead of a pointwise approach. Many modifications and variations will be apparent to those of ordinary skill in the art without departing from the scope and spirit of the described embodiments.

As shown, the training engine 216 performs stochastic gradient descent operations to minimize a training objective 410 using pointwise ranking techniques. The training objective 410 includes, without limitation, a first summation over all the positive videos based on the the rank loss function (L) 214 and a second summation over all the videos that enforces the approximately Gaussian distribution of the scores about zero. As persons skilled in the art will recognize, the training objective 410 also includes $l_2$ regularization terms for minimizing prediction error. The $l_2$ regularization terms reflect the logarithm of a Gaussian prior distribution with zero mean and variance $1/(2\lambda)$. In a similar fashion, the value of the parameter $\gamma$ reflects the variance of a prior distribution over the scores.

As shown in lines 11-20 of the training pseudocode 420, for each user, the training engine 216 iterates through all videos included in the user view history database 220. During each inner loop of this iteration, the training engine 216 calculates the score for the "current" user in combination with the "current" video. To calculate the scores for the current user, the training engine 216 extracts the user view history vector 280 associated with the current user from the user view history database 220. The training engine 216 may extract the user view history vector 280 in any technically feasible fashion. For example, in some embodiments, the training engine 216 extracts the row of the user view history database 220 that is associated with the current user.

The training engine 216 performs multiplication operations between the user view history vector 280 and the matrix of latent play history vectors 242 and then normalizes the resulting vector to generate a latent user vector 450 associated with the current user. Subsequently, to compute the score for the current user and the current video, the training engine 216 applies a user score equation 460. As a general matter, the user score equation 460 specifies the scores for a given user as the multiplication of the latent user vector 230 for the user and the matrix of latent play vectors 244.

If the current video is positive with respect to the current user (e.g., the current user has watched the current video), then the training engine 216 executes lines 13-15 of the training pseudocode 420. As shown, the training engine 216 computes a current error based on the derivative of the rank loss function (L) 214 with respect to the latent parameters included in the matrix of latent play history vectors 242 and the matrix of latent play vectors 244 at the computed score. Notably, the training engine applies a chain rule 470 to compute the derivative of the rank loss function (L) 214 as the derivative of smooth functions, including the derivative of the activation function 212 with respect to the score.

By contrast, if the current video is negative with respect to the current user (e.g., the current user has not watched the video), then the training engine 216 executes lines 17-18 of the training pseudocode 420. As shown in lines 17-18, the training engine 216 computes the current error based on enforcing the approximately Gaussian distribution of the scores about zero. In alternate embodiments, the training engine 216 may compute the current error in any technically feasible fashion that is consistent with optimizing the training objective 410.

The training engine 216 executes lines 19-20 of the training pseudocode 420 irrespective of whether the current user has watched the current video. At line 19, the training engine 216 computes and temporarily aggregates updates to the values of the latent parameters included in the matrix of latent play history vectors 242 in a vector ε. At line 20, the training engine 216 updates the values of the latent parameters included in the matrix of latent play vectors 244 based on the current error. After processing all the videos with respect to the current user, at lines 21-22, the training engine 216 performs a second iteration over all the videos. During the second iteration, the training engine 216 updates the values of the latent parameters included in the matrix of latent play history vectors 242 based on the vector ε.

The training engine 216 iterates over all the users included in the user view history database 220 until the training engine 216 determines that the stochastic gradient descent process has converged. The training engine 216 may determine that stochastic gradient descent process has converged in any technically feasible fashion. In general, when the training engine 216 terminates, the elements included in the matrix of latent play history vectors 422 and the scoring matrix 422 are minimized with respect to the rank loss function 214.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. In various embodiments, the techniques described herein may be applied in conjunction with any type of optimization techniques including, without limitation, any type of machine learning routines. For example, in some embodiments, the training engine 216 may implement listwise optimization techniques instead of pointwise optimization techniques.

Further, the training pseudocode 420 illustrates one implementation that includes various assumptions. Such assumptions may or may not be used in other implementations. For example, in some embodiments, the iteration over all items in lines 11-20 of the training pseudocode 420 may be replaced with a subsampled iteration. More specifically, since the number of negative items is typically far greater than the number of positive items, the training engine 216 may execute lines 11-20 for only a random sampling of the negative items.

In some embodiments, both the optimization techniques and assumptions may vary from the described embodiments. For example, in some embodiments, to implement listwise ranking, the training pseudocode 420 may be modified based on properties of lists of videos for each user. Notably, during listwise ranking, a simplifying assumption implicit in the training pseudocode 420 that the scores have a fixed standard deviation irrespective of the user may be replaced with a user-specific computation. More precisely, the training engine 216 may be configured to estimate the standard deviation for each user based on the empirical distribution of the scores for the user.

Figure 5:
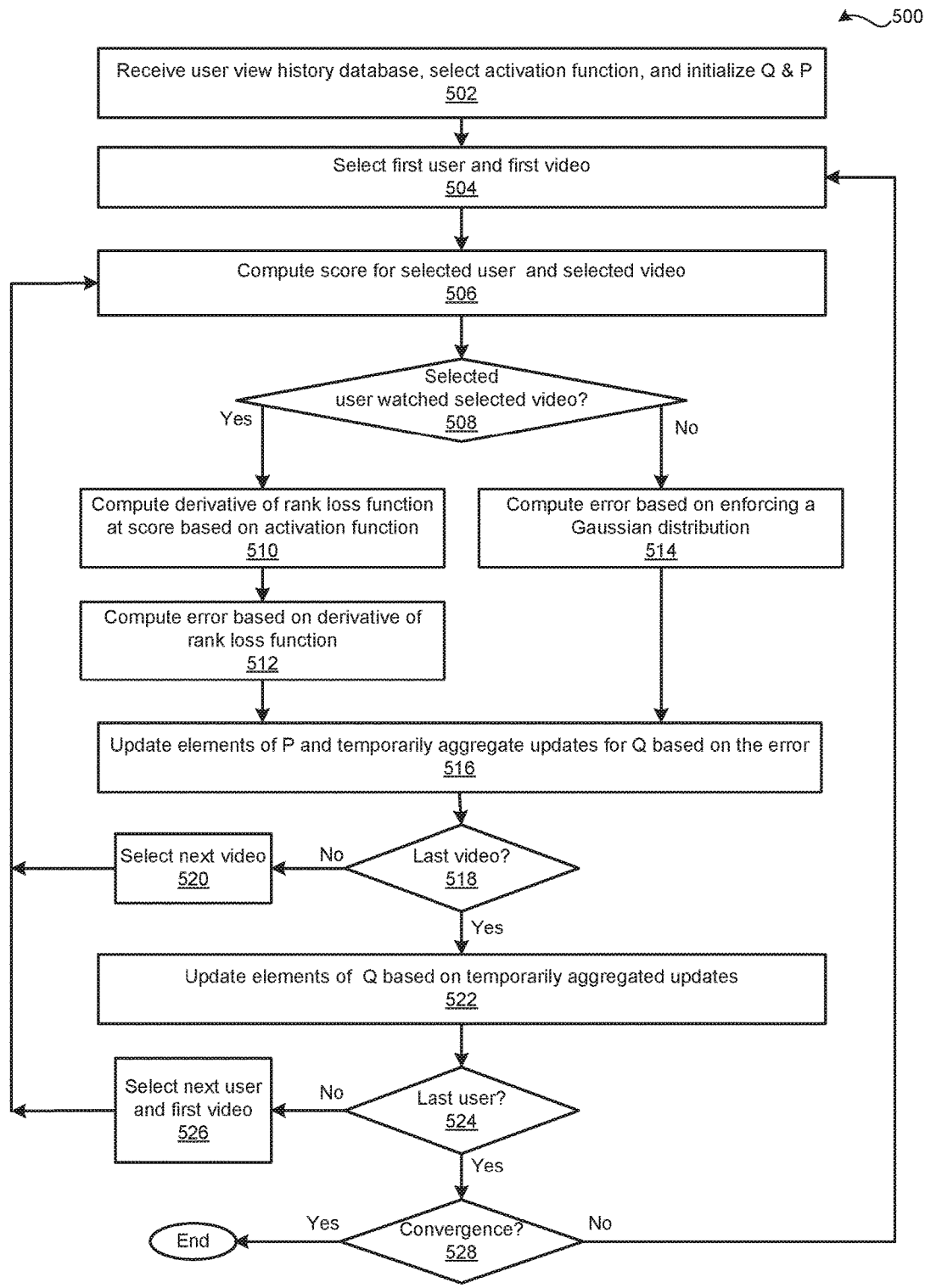
FIG. 5 is a flow diagram of method steps for training a matrix factorization model via a rank loss function, according to various embodiments of the present invention.

FIG. 5 is a flow diagram of method steps for training a matrix factorization model via a rank loss function, according to various embodiments of the present invention. Although the method steps are described with reference to the systems of FIGS. 1-4, persons skilled in the art will understand that any system configured to implement the method steps, in any order, falls within the scope of the present invention. For explanatory purposes, the context of FIG. 5 is that the training engine 216 trains the matrix factorization model 154 to rank videos for users based on the user view history database 220 and using stochastic gradient descent. In alternate embodiments, the training engine 216 may be configured to train a ranking model to rank any type of items for any type of objects based on any type of data and using any machine learning technique. For example, and without limitation, the training engine 216 may be configured to rank websites based on visits from users, store merchandise based on sales records for different regions, and so forth.

As shown, a method 500 begins at step 502, where the training engine 216 receives the user view history database 220, selects the activation function 212, and initializes the matrix of latent play history vectors 242 and the matrix of latent play vectors 244. For each of multiple users, the user view history database 220 includes the user view history vector 280 associated with the user. The user view history vector 280 indicates whether the user has viewed each of multiple items.

The training engine 216 uses an approximation to a Gaussian distribution of the predicted scores of the items to obtain the activation function 212. Notably, the training engine 216 ensures that the activation function 212 provides a smooth and differentiable mapping between the scores of the videos as predicted by the matrix factorization model 154 and the corresponding ranks of the videos. For example, in some embodiments, the training engine 216 selects the activation function 212 as a logistic function that approximates a cumulative distribution function (CDF) derived from an approximate Gaussian distribution. To initialize the latent dimensions included in the matrix factorization model 154 to approximately independent variables, the training engine 216 randomly assigns values to the elements included in the matrix of latent play history vectors 242 and the matrix of latent play vectors 244.

At step 504, the training engine 216 selects the first user that is associated with the user view history database 220 and the first video that is associated with the user view history database 220. As part of step 504, the training engine 216 identifies and/or constructs the user view history vector 280 associated with the user. The training engine 216 may identify and/or construct the user view history vector 280 in any technically feasible fashion and in any format. For example, for each user, because the data included in the user view history database 220 and the user view history vector 280 is sparse, the training engine 216 may explicitly store only "positive" videos that the user has watched.

At step 506, the training engine 216 computes the score for the selected user and the selected video. More specifically, the training engine 216 performs multiplication operations between the user view history vector 280 and the matrix of latent play history vectors 242 and then normalizes the resulting vector to generate the latent user vector 450 associated with the user. Subsequently, the training engine 216 performs multiplication operations between the latent user vector 230 and the matrix of latent play vectors 244 to generate the score for the selected user and the selected video. At step 508, the training engine 216 determines whether the selected user has watched the selected video based on the user view history vector 280. If, at step 508, the element of the user view history vector 280 that is associated with the selected video equals one, then the training engine 216 determines that the user has watched the selected video and the method 500 proceeds to step 510.

At step 510, the training engine 216 computes the derivative of the rank loss function 214 with respect to the latent parameters at the score. More precisely, the training engine 216 applies the chain rule 470 to decompose the derivative of the rank loss function 214 with respect to the elements included in the matrix factorization model 152 into multiplication operations between derivatives of smooth mappings. Notably, as part of step 510, the training engine 216 evaluates the rank loss function 214 at the score and computes the derivative of the activation function 212 with respect to the score. In alternate embodiments, the training engine 216 may compute the derivative of the rank loss function 214 in any technically feasible fashion that is based on the activation function 212. At step 512, the training engine 216 computes an error based on the derivative of the rank loss function 214 with respect to the latent parameters. As a general matter, the training engine 216 may compute the error in any technically feasible fashion that is consistent with optimizing the training objective 410. The method 500 then proceeds directly to step 516.

If, however, at step 508, the element of the user view history vector 280 that is associated with the selected video equals zero, then the training engine 216 determines that the user has not watched the selected video and the method 500 proceeds directly to step 514. At step 514, the training engine 216 computes an error based on enforcing the approximately Gaussian distribution of the scores about zero.

At step 516, the training engine 216 updates the elements included in the matrix of latent play vectors 244 based on the error. By contrast, the training engine 216 computes updates to the elements included in the matrix of latent play history vectors 242 based on the error and temporarily aggregates these updates. The training engine 216 may compute the updates in any technically feasible fashion that is consistent with the regularization terms included in the implemented stochastic gradient descent optimization techniques. In alternate embodiments, the training engine 216 may implement any number and type of optimization techniques and may update the matrix of latent play vectors 244 and/or the matrix of latent play history vectors 242 in any technically feasible fashion and in any order that is consistent with the implemented optimization techniques.

At step 518, the training engine 216 determines whether the selected video is the last video associated with the user view history database 220. If, at step 518, the training engine 216 determines that the selected video is not the last video associated with the user view history database 220, then the method 500 proceeds to step 520. At step 520, the training engine 216 selects the next video that is associated with the user view history database 220. The method 500 then returns to step 506 and the training engine 216 performs optimization operations based on the selected user and the selected video.

If, however, at step 518, the training engine 216 determines that the selected video is the last video associated with the user view history database 220, then the method 500 proceeds directly to step 522. At step 522, the training engine 216 updates the elements included in the matrix of latent play history vectors 242 based on the temporarily aggregated updates for the matrix of latent play history vectors 242. At step 524, the training engine 216 determines whether the selected user is the last user associated with the user view history database 220.

If, at step 524, the training engine 216 determines that the selected user is not the last user associated with the user view history database 220, then the method 500 proceeds to step 526. At step 526, the training engine 216 selects the next user that is associated with the user view history database 220 and the first video that is associated with the user view history database 220. The method 500 then returns to step 506 and the training engine 216 performs optimization operations based on the selected user and the selected video.

If, however, at step 524, the training engine 216 determines that the selected user is the last user associated with the user view history database 220, then the method 500 proceeds directly to step 528. At step 528, the training engine 216 determines whether the optimization process has converged. The training engine 216 may determine whether the optimization process has converged in any technically feasible fashion and based on any criterion. For example, the training engine 216 may determine that the optimization process has converged based on the magnitude of the most recently computed errors.

If, at step 528, the training engine 216 determines that the optimization process has not converged, then the method 500 returns to step 504, where the training engine 216 selects the first user that is associated with the user view history database 220 and the first video that is associated with the user view history database 220. The training engine 216 continues to cycle through steps 502-528 optimizing the matrix factorization model 154 for each of the users and each of the videos, until the training engine 216 determines that the optimization process has converged. If, however, at step 528, the training engine 216 determines that the optimization process has converged, then the training of the matrix factorization model 154 is complete, and the method 500 terminates.

Figure 6:
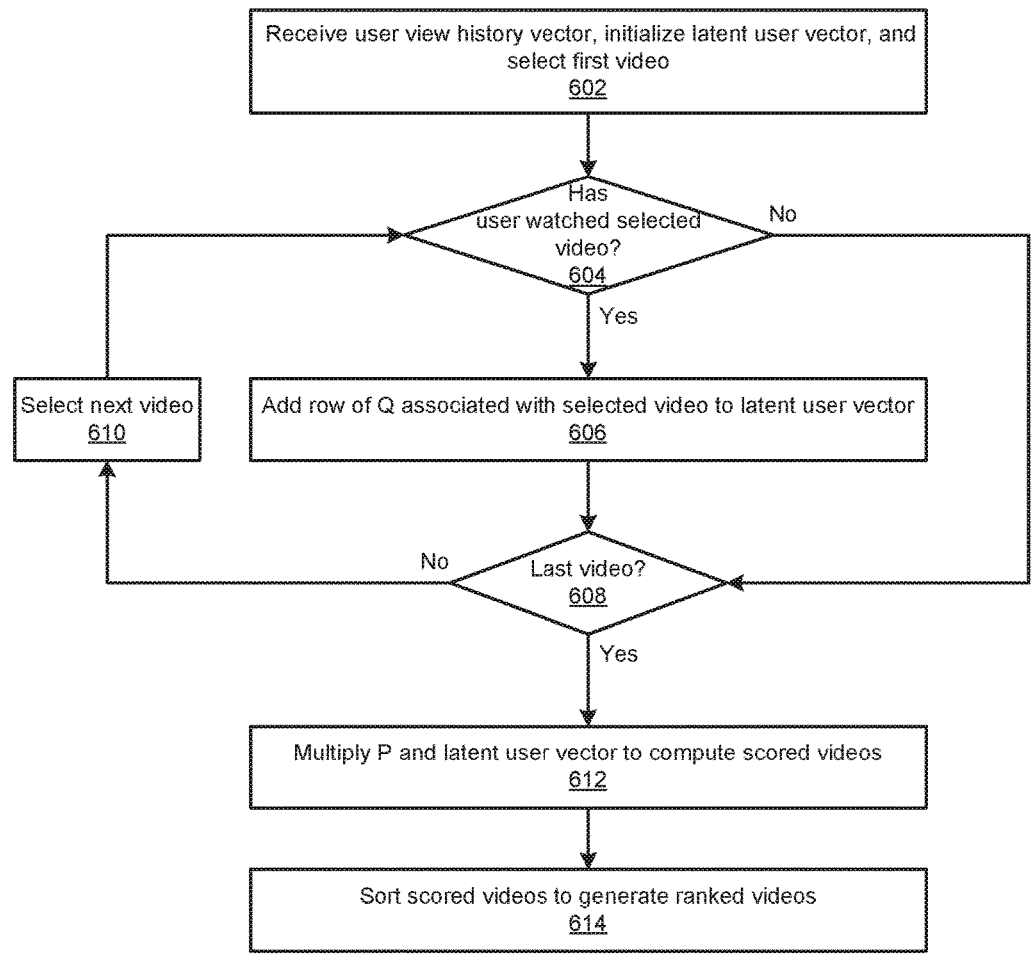
FIG. 6 is a flow diagram of method steps for ranking items for a given user based on a matrix factorization model, according to various embodiments of the present invention.

FIG. 6 is a flow diagram of method steps for ranking items for a given user based on a matrix factorization model, according to various embodiments of the present invention. Although the method steps are described with reference to the systems of FIGS. 1-4, persons skilled in the art will understand that any system configured to implement the method steps, in any order, falls within the scope of the present invention.

For explanatory purposes, the context of FIG. 6 is that the training engine 216 performs the steps included in the method 500 to train the matrix factorization model 154 to rank videos based on the user view history database 220. In alternate embodiments, the matrix factorization model 154 may be trained in any technically feasible fashion. For example, the training engine 216 may adapt the techniques outlined herein to train the matrix factorization model 154 via listwise optimization. Further, the training engine 216 may train the matrix factorization model 154 based on any binary and sparse data for any number and type of objects and any number and type of items. For example, and without limitation, the items may include songs, goods available for purchase, website popularity, and so forth.

As shown, a method 600 begins at step 602, where the scorer 252 included in the ranking engine 156 receives the user view history vector 280, sets the latent user vector 450 equal to a vector of zeroes, and selects the first video associated with the user view history vector 280. At step 604, the scorer 252 determines whether the user has watched the selected video based on the user view history vector 280. If the element of the user view history vector 280 that is associated with the selected video equals one, then the scorer 252 determines that the user has watched the selected video and the method 600 proceeds to step 606. At step 606, the scorer 252 selects the row of the matrix of latent play history vectors 242 that is associated with the selected video and adds the selected row to the latent user vector 450.

If, however, at step 604, the element of the user view history vector 280 that is associated with the selected video equals zero, then the scorer 252 determines that the user has not watched the selected video and the method 600 proceeds directly to step 608. At step 608, the scorer 252 determines whether the selected video is the last video associated with the user view history vector 280. If the scorer 252 determines that the selected video is not the last video associated with the user view history vector 280, then the method 600 proceeds to step 610. At step 610, the scorer 252 selects the next video associated with the user view history vector 280, and the method 600 returns to step 604. The scorer 252 continues to cycle through steps 604-610, selecting and processing videos until the scorer 252 determines that the selected video is the last video associated with the user view history vector 280.

If, however, at step 608, the scorer 252 determines that the selected video is the last video associated with the user view history vector 280, the method 600 proceeds directly to step 612. At step 612, the scorer 252 performs multiplication operations between the latent user vector 450 and the matrix of latent play vectors 255 to generate the scored videos 285. At step 614, the sorter 254 sorts the scored videos 285 to generate the ranked videos 290, and the method 600 terminates. Notably, the ranked videos 290 are directly minimized with respect to the rank loss function 214 included in the training subsystem 152.

In sum, the disclosed techniques may be used to generate a ranked list of items for a user based on implicit feedback data. A ranking infrastructure includes a training subsystem that trains a matrix factorization model and a ranking engine that ranks items based on the matrix factorization model. In general, the ranking infrastructure leverages properties of the implicit feedback data and properties of the matrix factorization model to predict scores for items. More specifically, based on the binary nature and sparseness of the implicit feedback input data and the relatively large number of latent parameters included in the matrix factorization model, the training subsystem approximates the distribution of the predicted scores by a Gaussian distribution. Based on this Gaussian distribution, the training subsystem selects an activation function that provides a smooth mapping between scores and corresponding ranks during training.

The training subsystem then implements stochastic gradient descent techniques to train the matrix factorization model via a rank loss function. Notably, as part of minimizing the rank loss function, the training subsystem applies the chain rule to the activation function to compute the derivative of the rank loss function. Subsequently, the ranking engine applies the matrix factorization model to the input data for a given user to generate scores of items for a user. Finally, the ranking engine sorts the scores to generate a ranked list of items that is tailored to the user.

Advantageously, because the activation function provides a smooth mapping between scores and corresponding ranks, the training engine may efficiently minimize the rank loss function without approximating the rank loss function. Further, since applying the matrix factorization model generated by the training engine involves performing relatively inexpensive matrix multiplication operations, the ranking engine may efficiently and accurately determine the ranked list of videos for a given user. Notably, the techniques implemented in the ranking subsystem are agnostic with respect to the rank loss function. Consequently, unlike conventional approaches to ranking that are tuned based on a specific rank loss function, the ranking subsystem may flexibly implement various types of rank loss functions. More precisely, the ranking subsystem may implement any rank loss function that is a differentiable function of the ranks of the positive items when the rank is considered a continuous variable.

1. In some embodiments, a method comprises determining an activation function that maps between scores associated with a plurality of items and ranks associated with the plurality of items based on an approximate Gaussian distribution of the scores; computing a first score for input data associated with a first item included in the plurality of items based on a matrix factorization model; computing a first value of a rank loss function based on the first score and the activation function; and modifying one or more elements included in the matrix factorization model based on the first value of the rank loss function.

2. The method of clause 1, wherein modifying the one or more elements comprises computing a derivative of the rank loss function at a first element included in the one or more elements; computing a delta from the first element, wherein the delta is in a direction associated with a negative gradient of the rank loss function based on the derivative of the rank loss function; and adding the delta to the first element.

3. The method of clauses 1 or 2, wherein computing the derivative of the rank loss function comprises computing a value of the activation function at the score, and computing a derivative of the rank loss function at the first element based on the value of the activation function.

4. The method of any of clauses 1-3, wherein the matrix factorization model includes a first matrix and a second matrix, the one or more elements comprises a first element that is included in the first matrix, and further comprising computing a second score for input data associated with a second item included in the plurality of items based on the matrix factorization model; modifying a second element included in the first matrix based on the second score; and modifying a third element included in the second matrix based on the first value of the rank loss function and the second value of the rank loss function.

5. The method of any of clauses 1-4, wherein the first item is associated with positive feedback from a user and the second item is not associated with any feedback from the user.

6. The method of any of clauses 1-5, wherein the activation function comprises a nonlinear approximation to a cumulative distribution function derived from the approximate Gaussian distribution.

7. The method of any of clauses 1-6, wherein the nonlinear approximation comprises a logistic function.

8. The method of any of clauses 1-7, wherein the rank loss function measures a normalized Discounted Cumulative Gain (nDCG) metric.

9. The method of any of clauses 1-8, wherein modifying the one or more elements comprises executing one or more stochastic gradient descent optimization operations on the matrix factorization model to minimize the rank loss function.

10. In some embodiments, a computer-implemented computer-readable storage medium includes instructions that, when executed by a processor, cause the processor to perform the steps of computing one or more scores for input data associated with a plurality of items based on a matrix factorization model; determining a mapping between the one or more scores and one or more corresponding ranks based on an expected approximate distribution of a plurality of scores that is associated with the plurality of items; and modifying one or more elements included in the matrix factorization model to minimize a training objective based on the mapping, wherein the training objective includes a rank loss function.

11. The computer-readable storage medium of clause 10, wherein modifying the one or more elements comprises computing a derivative of the rank loss function at a first element included in the one or more elements; computing a delta from the first element, wherein the delta is in a direction associated with a decreasing gradient of the rank loss function based on the derivative of the rank loss function; and adding the delta to the first element.

12. The computer-readable storage medium of clauses 10 or 11, wherein the mapping comprises a nonlinear approximation to the expected approximate distribution.

13. The computer-readable storage medium of any of clauses 10-12, wherein the nonlinear approximation comprises a piecewise quadratic function.

14. The computer-readable storage medium of any of clauses 10-13, wherein the rank loss function measures an area under a Receiver Operating Characteristic curve.

15. The computer-readable storage medium of any of clauses 10-14, wherein modifying the one or more elements comprises executing one or more listwise optimization operations on the matrix factorization model.

16. The computer-readable storage medium of any of clauses 10-15, wherein the matrix factorization model includes a first matrix and a second matrix, and further comprising multiplying the first matrix and an input vector associated with a first user and the plurality of items to generate a latent user vector; multiplying the second matrix and the latent user vector to generate a score for each item included in the plurality of items; and ranking each item in the plurality of items based on the scores.

17. In some embodiments, a system comprises at least one memory storing instructions associated with a matrix factorization model and a training engine; and a processor that is coupled to the at least one memory and, when executing the instructions, is configured to determine an activation function that maps between scores associated with a plurality of items and ranks associated with the plurality of items based on an approximate Gaussian distribution of the scores; compute a first score for input data associated with a first item included in the plurality of items based on the matrix factorization model; compute a derivative of a rank loss function based on the first score and the activation function; and modify one or more elements included in the matrix factorization model based on the derivative of the rank loss function to minimize the discrepancies between the scores and the ranks.

18. The system of clause 17, wherein the training engine is configured to compute the derivative of the rank loss function by applying a chain rule to a derivative of the activation function at the first score.

19. The system of clauses 17 or 18, wherein the activation function comprises a nonlinear approximation to a cumulative distribution function derived from the approximate Gaussian distribution.

20. The system of any of clauses 17-19, wherein the rank loss function measures a normalized Discounted Cumulative Gain (nDCG) metric.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
   identifying a plurality of items that are associated with a plurality of scores generated by one or more users;
   determining an activation function that maps the plurality of scores and a plurality of ranks associated with the plurality of items based on an approximate Gaussian distribution of the plurality of scores;
   computing, based on a matrix factorization model, a first predicted score for input data associated with a first item included in the plurality of items;
   computing a first value of a rank loss function based on the first predicted score and the activation function;
   modifying one or more elements included in the matrix factorization model based on the first value of the rank loss function; and
   generating a list of scored items by applying the modified matrix factorization model to the plurality of items.

2. The method of claim 1, wherein modifying the one or more elements comprises:
   computing a derivative of the rank loss function at a first element included in the one or more elements;
   computing a delta from the first element, wherein the delta is in a direction associated with a negative gradient of the rank loss function based on the derivative of the rank loss function; and
   adding the delta to the first element.

3. The method of claim 2, wherein computing the derivative of the rank loss function comprises:
   computing a value of the activation function at the first predicted score; and
   computing a derivative of the rank loss function at the first element based on the value of the activation function.

4. The method of claim 1, wherein the matrix factorization model includes a first matrix and a second matrix, the one or more elements comprises a first element that is included in the first matrix, and further comprising:
   computing, based on the matrix factorization model, a second predicted score for input data associated with a second item included in the plurality of items;
   modifying a second element included in the first matrix based on the second predicted score;
   computing a second value of the rank loss function based on the second predicted score and the activation function; and
   modifying a third element included in the second matrix based on the first value of the rank loss function and the second value of the rank loss function.

5. The method of claim 4, wherein the first item is associated with positive feedback from a user and the second item is not associated with any feedback from the user.

6. The method of claim 1, wherein the activation function comprises a nonlinear approximation to a cumulative distribution function derived from the approximate Gaussian distribution.

7. The method of claim 6, wherein the nonlinear approximation comprises a logistic function.

8. The method of claim 1, wherein the rank loss function measures a normalized Discounted Cumulative Gain (nDCG) metric.

9. The method of claim 1, wherein modifying the one or more elements comprises executing one or more stochastic gradient descent optimization operations on the matrix factorization model to minimize the rank loss function.

10. A computer-implemented computer-readable storage medium including instructions that, when executed by a processor, cause the processor to perform the steps of:
    identifying a plurality of items that are associated with a plurality of scores generated by one or more users;
    computing, based on a matrix factorization model, one or more predicted scores for input data associated with one or more items included in the plurality of items;
    determining a mapping of the plurality of scores and one or more corresponding ranks associated with the plurality of items based on an expected approximate distribution of the plurality of scores; and
    modifying one or more elements included in the matrix factorization model to minimize a training objective based on the mapping, wherein the training objective includes a rank loss function; and
    generating a list of scored items by applying the modified matrix factorization model to the plurality of items.

11. The computer-readable storage medium of claim 10, wherein modifying the one or more elements comprises:
    computing a derivative of the rank loss function at a first element included in the one or more elements;
    computing a delta from the first element, wherein the delta is in a direction associated with a decreasing gradient of the rank loss function based on the derivative of the rank loss function; and
    adding the delta to the first element.

12. The computer-readable storage medium of claim 10, wherein the mapping comprises a nonlinear approximation to the expected approximate distribution.

13. The computer-readable storage medium of claim 12, wherein the nonlinear approximation comprises a piecewise quadratic function.

14. The computer-readable storage medium of claim 10, wherein the rank loss function measures an area under a Receiver Operating Characteristic curve.

15. The computer-readable storage medium of claim 10, wherein modifying the one or more elements comprises executing one or more listwise optimization operations on the matrix factorization model.

16. The computer-readable storage medium of claim 10, wherein the matrix factorization model includes a first matrix and a second matrix, and generating the list of scored items comprises:
    multiplying the first matrix with an input vector associated with a first user and the plurality of items to generate a latent user vector;
    multiplying the second matrix with the latent user vector to generate an updated predicted score for each item included in the plurality of items; and
    ranking each item in the plurality of items based on the plurality of updated predicted scores.

17. A system, comprising:
    at least one memory storing instructions associated with a matrix factorization model and a training engine; and
    a processor that is coupled to the at least one memory and, when executing the instructions, is configured to:
        identify a plurality of items that are associated with a plurality of scores generated by one or more users;
        determine an activation function that maps the plurality of scores and a plurality of ranks associated with the plurality of items based on an approximate Gaussian distribution of the plurality of scores;
        compute, based on a matrix factorization model, a first predicted score for input data associated with a first item included in the plurality of items;

compute a derivative of a rank loss function based on the first predicted score and the activation function;

modify one or more elements included in the matrix factorization model based on the derivative of the rank loss function to minimize discrepancies between the plurality of scores and the plurality of ranks; and generate a list of scored items by applying the modified matrix factorization model to the plurality of items.

18. The system of claim 17, wherein the training engine is configured to compute the derivative of the rank loss function by applying a chain rule to a derivative of the activation function at the first predicted score.

19. The system of claim 17, wherein the activation function comprises a nonlinear approximation to a cumulative distribution function derived from the approximate Gaussian distribution.

20. The system of claim 17, wherein the rank loss function measures a normalized Discounted Cumulative Gain (nDCG) metric.

* * * * *